June 25, 1963     A. BOSCHI     3,094,853
FLEXIBLE TRANSMISSION COUPLING

Filed Sept. 6, 1962     2 Sheets—Sheet 1

June 25, 1963  A. BOSCHI  3,094,853

FLEXIBLE TRANSMISSION COUPLING

Filed Sept. 6, 1962

United States Patent Office 3,094,853
Patented June 25, 1963

3,094,853
FLEXIBLE TRANSMISSION COUPLING
Antonio Boschi, Milan, Italy, assignor to Societa Applicazioni Gomma Antivibranti "S.A.G.A." S.p.A., Milan, Italy
Filed Sept. 6, 1962, Ser. No. 221,832
Claims priority, application Italy Dec. 15, 1961
4 Claims. (Cl. 64—14)

This invention relates to flexible transmission couplings of the type comprising a hub externally provided with a circumferential series of radial wedge-shaped ribs extending in planes including the hub axis, and a rim coaxial with the hub, provided with inner wedge-shaped ribs intermeshing with the hub ribs through the interposition of an elastomeric intermediate.

The primary object of this invention is to provide a coupling of the abovementioned type which will withstand high torques and is at the same time of highly resilient properties in all directions.

In order to attain the above object and further objects which will become apparent from the appended description the invention provides a flexible transmission coupling of the abovementioned type, wherein pre-stressed rubber pads are interposed between the ribs on the hub and rim, respectively.

Further characteristic features and advantages of this invention will be understood from the appended detailed description referring to the accompanying drawings given by way of a non-limiting example, wherein.

Figure 1:
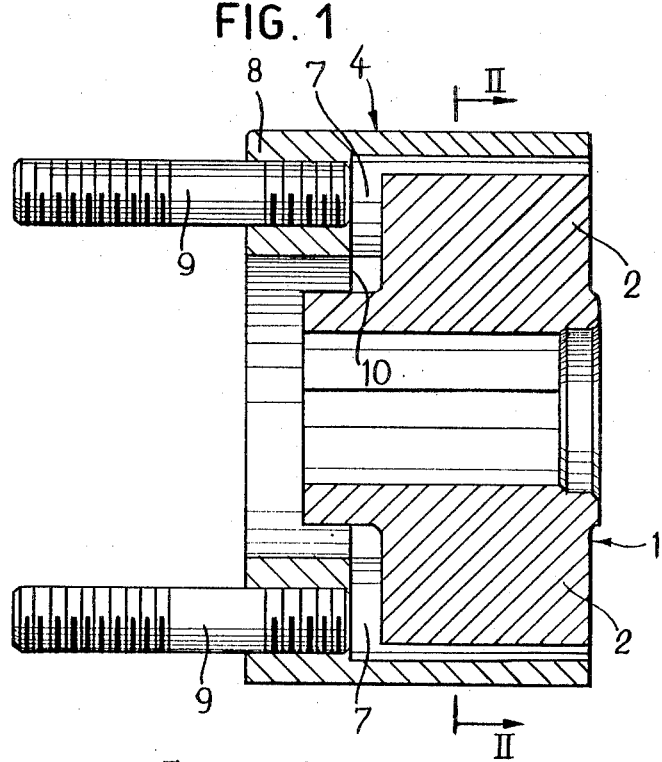
FIGURE 1 is an axial sectional view of an embodiment of this invention.
Figure 4:
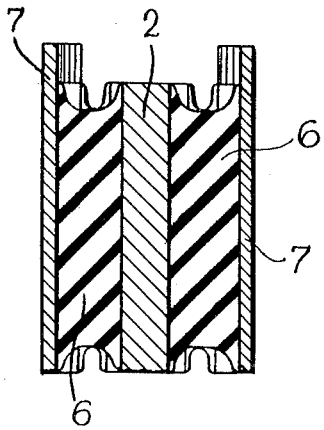
FIGURE 4 is a sectional view of FIGURE 3 on line IV—IV.
Figure 2:
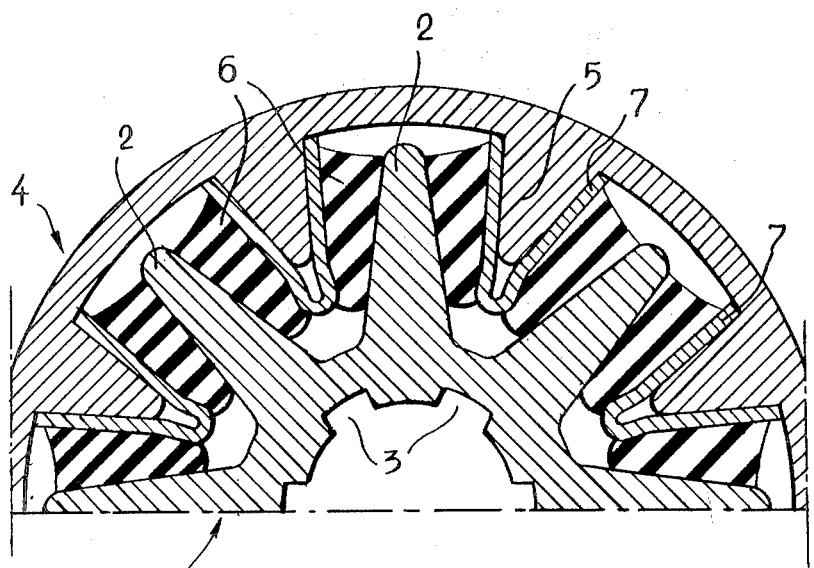
FIGURE 2 is a sectional view of FIGURE 1 on line II—II.

An axially bored hub 1 is externally provided with a uniform circumferential series of radial wedge-shaped ribs 2 extending in axial planes.

The hub 1 is formed on its bore surface with longitudinal grooves 3 for splining to one of the shafts to be coupled by the coupling.

A rim 4 is coaxially arranged with the hub 1 and is formed with inner wedge-shaped ribs 5 alternating with the ribs on the hub 1.

The radial depth of the recess between each two ribs 5 is filled by about 75% to 90% by their cooperating rib 2 the apex of which is spaced from the bottom of the recess by an extent equalling about one tenth of the radial height of the latter rib.

An approximately prismatic rubber pad 6 is bonded to each flank of the ribs 2 on the hub 1 and is connected to the nearer pad on the contiguous rib by means of a resilient metal plate 7 bent to V-shape and bonded to the two pads.

The ribs 5 on the rim 4 are forced into the "mouth" of the plates 7 in order to pre-stress the pads.

The rim 4 axially extends beyond the hub 1 by an annular portion 8 adapted to form the roots for the stud bolts 9 for attachment to one of the shafts which shall be interconnected by the coupling.

The plates 7 are larger in axial length than the axial length of the ribs 2 and therefore frontally extend beyond the hub in order to abut an annular abutment face 10 formed within the rim 4 at its portion 8.

The rubber pads 6 only partly fill the recess between the ribs on the hub 1 and rim 4 and are spaced in a parallel relationship to the coupling axis at locations such that the bottoms of the recesses between the ribs 2 and ribs 5 are not filled by the rubber; more particularly, the radial dimension of each pad is just slightly smaller, such as by 10% to 15% than the radial height of the ribs 2.

Figure 3:
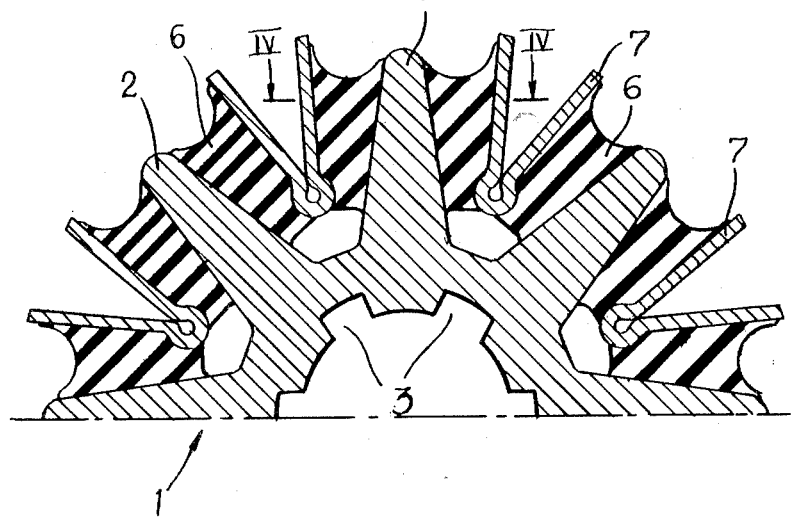
FIGURE 3 is a sectional view similar to FIGURE 2 of a hub and rubber pads prior to assembly with the rim.

The radially outer faces 6a of the pads 6 are substantially cylindrically convex before forcing of the ribs 5 in the mouth of the plates 6, as shown in FIGURE 3.

In assembly, as the ribs 5 are forced against the plates 6, the above-mentioned faces 6a are substantially flattened due to the pre-compression of the pads against ribs 2 on the hub.

This structure is intended to cause the pad rubber to work exclusively by compression and at the same time to assure a greatest possible surface area of the pads parallel with the opposed faces of the ribs, so that the load transmitted perpendicular to the said faces is distributed over a wide surface, thereby reducing the specific pressure on the interposed pads, whereby the coupling withstands high torques.

Moreover, the pad rubber flows on deformation and expands into the clearances on the bottoms of the recesses between the ribs, thereby improving flexibility of the coupling in all directions.

What I claim is:

1. A flexible transmission coupling comprising a rigid rim member having integrally formed thereon a circumferential series of radially inwardly directed wedge-shaped ribs extending in axial planes, a rigid hub member having integrally formed thereon a circumferential series of radially outwardly directed wedge-shaped ribs extending in axial planes in the recesses between the ribs on the rim, an axially elongated substantially prismatic pad of resilient elastomeric material located between a load-transmitting face on each of the ribs on the hub and a cooperating load-transmitting face on a rib on the rim, said pad being bonded to the load-transmitting face on the rib on the hub, and a V-bent metal plate between each pair of pads located in a common recess between the ribs on the hub, said plate having its outer faces bonded to the respective pads in the pair and having a rib on the rim wedged into the mouth of the plate whereby the pads in the pair are precompressed against their respective ribs on the hub while leaving free a bottom section in each recess both in the rim and hub.

2. A flexible transmission coupling as claimed in claim 1, wherein each of the pads comprises a radially outer surface which is cylindrically convex in free non-precompressed condition of the pad, and which is substantially flat in precompressed condition of the pad.

3. A flexible transmission coupling as claimed in claim 1, moreover comprising an annular axial-abutment surface at one end of the rim, and each of said V-bent metal plates axially protruding beyond the axial length of the ribs on the hub into an axial abutment with said surface.

4. A flexible transmission coupling as claimed in claim 1, wherein the radial depth of each recess between the ribs on the rim is occupied to an extent of 75% to 90% by its respective rib on the hub, and wherein the last mentioned rib is spaced from the bottom of the recess by an extent approximately equalling 1/10 of the radial height of said last mentioned rib.

References Cited in the file of this patent

UNITED STATES PATENTS

| 2,219,142 | Williams | Oct. 22, 1940 |
| 2,219,144 | Williams | Oct. 22, 1940 |
| 2,337,287 | Williams | Dec. 21, 1943 |

FOREIGN PATENTS

| 763,768 | Great Britain | Dec. 19, 1956 |